United States Patent [19]
Isley

[11] Patent Number: 6,158,539
[45] Date of Patent: Dec. 12, 2000

[54] LEVELLING SYSTEM AND METHOD FOR OFF-ROAD VEHICLES

[75] Inventor: Reggald Emory Isley, Grande Prairie, Canada

[73] Assignee: Risley Enterprises Ltd.

[21] Appl. No.: 09/159,839

[22] Filed: Sep. 24, 1998

[51] Int. Cl.$^7$ .................................................. B62D 33/06
[52] U.S. Cl. .................................. 180/89.14; 180/89.15; 280/6.154
[58] Field of Search .............................. 280/6.15, 6.153, 280/6.154; 180/89.14, 89.15

[56] References Cited

U.S. PATENT DOCUMENTS 4,679,803  7/1987  Biller et al. ........................... 280/1.654
5,337,847  8/1994  Woods et al. ........................... 280/6.154

*Primary Examiner*—Kenneth R. Rice
*Attorney, Agent, or Firm*—Oyen Wiggs Green & Mutala

[57] ABSTRACT

An off-road vehicle has an undercarriage and a superstructure and a tilting mechanism for levelling the superstructure. The tilting mechanism comprises upper and lower members coupled to tilt about a tilt axis by a hinge. The lower member is pivotally mounted to the undercarriage. A brake allows the orientation of the tilt axis relative to the undercarriage to be locked. The tilt mechanism allows the superstructure to be levelled by a method which includes the steps of releasing the brake, rotating the lower member until the tilt axis is horizontal, and tilting the upper member about the tilt axis until the superstructure is level. The tilting mechanism is simple and provides a full range of tilt in all directions. A tilting mechanism may be retrofitted to existing vehicles.

27 Claims, 5 Drawing Sheets

LEVELLING SYSTEM AND METHOD FOR OFF-ROAD VEHICLES

TECHNICAL FIELD

This invention relates to a levelling system and method for levelling the superstructure of an vehicle when the vehicle is located on uneven terrain. The system and method may be used, for example, for levelling off-road tree harvesting machines, excavators or other vehicles which are operated over uneven ground.

BACKGROUND

Off-road machines for felling trees and for handling felled trees ("feller bunchers") have achieved wide acceptance in the forest industry. Such machines typically have a crawler type undercarriage for mobility over uneven terrain, a superstructure attached to the undercarriage and an extendible boom attached to the superstructure. The superstructure typically houses an engine and hydraulic pump system to operate the machine's moving parts and generally comprises a cab from which the machine operator controls the machine. Accessories such as grapples, tree falling heads, cut off saws, or delimbing devices are typically mounted to the boom. The superstructure is typically mounted to the undercarriage on a pivot so that the superstructure and boom can be swung about a vertical axis.

Tree harvesting machines of the type described above are often used off-road on uneven terrain. Therefore, after the vehicle has been driven to a desired location to do work the undercarriage of the vehicle may not be horizontal and the axis of rotation of the superstructure may not be vertical. It is highly desirable, however, for the comfort of the operator and for the most efficient functioning of the machine that the superstructure of the machine be horizontal while the machine is working. Furthermore, in general, the trees which the machine harvests grow essentially vertically. When the machine is used to handle standing trees, as opposed to previously cut trees, and the superstructure is maintained horizontal while the machine is working then a boom-mounted accessory can be designed to work on a vertical tree without the need for an additional mechanism to tilt the accessory to align with the tree. Accordingly, it has been found to be useful to mount a tilting mechanism between the superstructure of the machine and the undercarriage. The operator of the machine can adjust the tilting mechanism to keep the superstructure horizontal even when the undercarriage of the machine is inclined at a significant angle to the horizontal.

Early tilting mechanisms only provided for rotation about a single axis. These tilting mechanisms are called "two-way" tilting mechanisms because they allow the angle of tilt to be adjusted in two directions (e.g. clockwise and anti-clockwise) about the single axis. To maintain the superstructure of a machine equipped with a two-way tilting mechanism horizontal the operator of the machine must first orient the machine with the tilting axis perpendicular to the fall line of the ground under the machine's undercarriage. A two-way tilting mechanism cannot generally maintain the superstructure of a machine horizontal when the tilting axis is not horizontal.

So called "four-way" tilting mechanisms allow the superstructure of a machine to be tilted back and forth about each one of a pair of mutually perpendicular axes. A four-way tilting mechanism is therefore capable of maintaining the superstructure of a machine level, within its limits of motion, independently of the direction of inclination of the undercarriage.

Currently available four-way tilting mechanisms have several disadvantages. Firstly, they can be complicated and expensive to manufacture; secondly, they can suffer from not being rugged enough to handle the forces typically exerted on off-road machinery; thirdly, most prior art four-way tilting mechanisms can not tilt equally in all directions. Most prior art four-way tilting mechanisms can tilt through a larger angular range about one axis than about a second axis. Operating off-road machinery equipped with such levelling mechanisms can therefore require a machine operator to continuously adjust the orientation of the machine's undercarriage when the machine is working on ground where a high degree of tilt is required to maintain the machine's superstructure level.

There is a need for a simple, robust tilting mechanism that avoids disadvantages of prior 2-way and 4-way levelling mechanisms.

SUMMARY OF INVENTION

An object of the invention is to provide an off road vehicle which can be levelled to permit operation of the vehicle on uneven terrain. Accordingly, the invention provides a vehicle comprising a tilt mechanism for maintaining an axis of a superstructure of the vehicle vertical. The vehicle comprises: an undercarriage; a superstructure; and, a tilt mechanism connecting the undercarriage to the superstructure. The tilt mechanism comprises: a lower member pivotally coupled to the undercarriage; an upper member pivotally coupled to the superstructure; a hinge pivotally connecting the upper and lower members about a tilt axis; a power actuator for tilting the upper member relative to the lower member about the tilt axis; and braking means engageable to fix an orientation of the tilt axis relative to the undercarriage and releaseable to permit the lower member to be rotated to change the orientation of the tilt axis relative to the undercarriage.

One specific embodiment of the invention includes a driving means connected between the lower member and the undercarriage for rotating the lower member relative to the undercarriage. The invention is operable without such a driving means.

Another aspect of the invention provides a method for levelling an off-road vehicle having an undercarriage. The method begins with the step of providing the vehicle with a tilting assembly connecting the undercarriage to a superstructure. The tilting assembly comprises: a lower member pivotally coupled to the undercarriage; an upper member pivotally coupled to the superstructure; a hinge pivotally connecting the upper and lower members about a tilt axis; a power actuator for tilting the upper member relative to the lower member about the tilt axis; and braking means engageable to fix an orientation of the tilt axis relative to the undercarriage and releaseable to permit the lower member to be rotated to change the orientation of the tilt axis relative to the undercarriage. The method continues with the steps of: releasing the braking means; rotating the lower member relative to the undercarriage until the tilt axis is horizontal; engaging the braking means; and, operating the power actuator to tilt the upper member about the tilt axis until the superstructure is level.

The step of rotating the lower member may comprise operating a motor coupled between the lower member and the undercarriage to rotate the lower member relative to the undercarriage. In another embodiment of the invention the step of rotating the lower member comprises engaging a boom on the superstructure with the ground and operating a driving means coupled between the superstructure and the upper member to turn the upper member relative to the superstructure.

A further aspect of the invention provides a tilt mechanism for maintaining an axis of a superstructure of a vehicle vertical. The tilt mechanism comprises: a lower member adapted to be pivotally coupled to a vehicle undercarriage; an upper member adapted to be pivotally coupled to a vehicle superstructure; a hinge pivotally connecting the upper and lower members about a tilt axis; a power actuator for tilting the upper member relative to the lower member about the tilt axis; and braking means coupled to the lower member, the braking means engageable with a member on the undercarriage to lock an orientation of the tilt axis relative to the undercarriage, the braking means releaseable to permit the lower member to be rotated relative to the undercarriage.

BRIEF DESCRIPTION OF DRAWINGS

In drawings which illustrate specific embodiments of the invention, but which should not be construed as restricting the spirit or scope of the invention in any way.

DESCRIPTION

Figure 1:
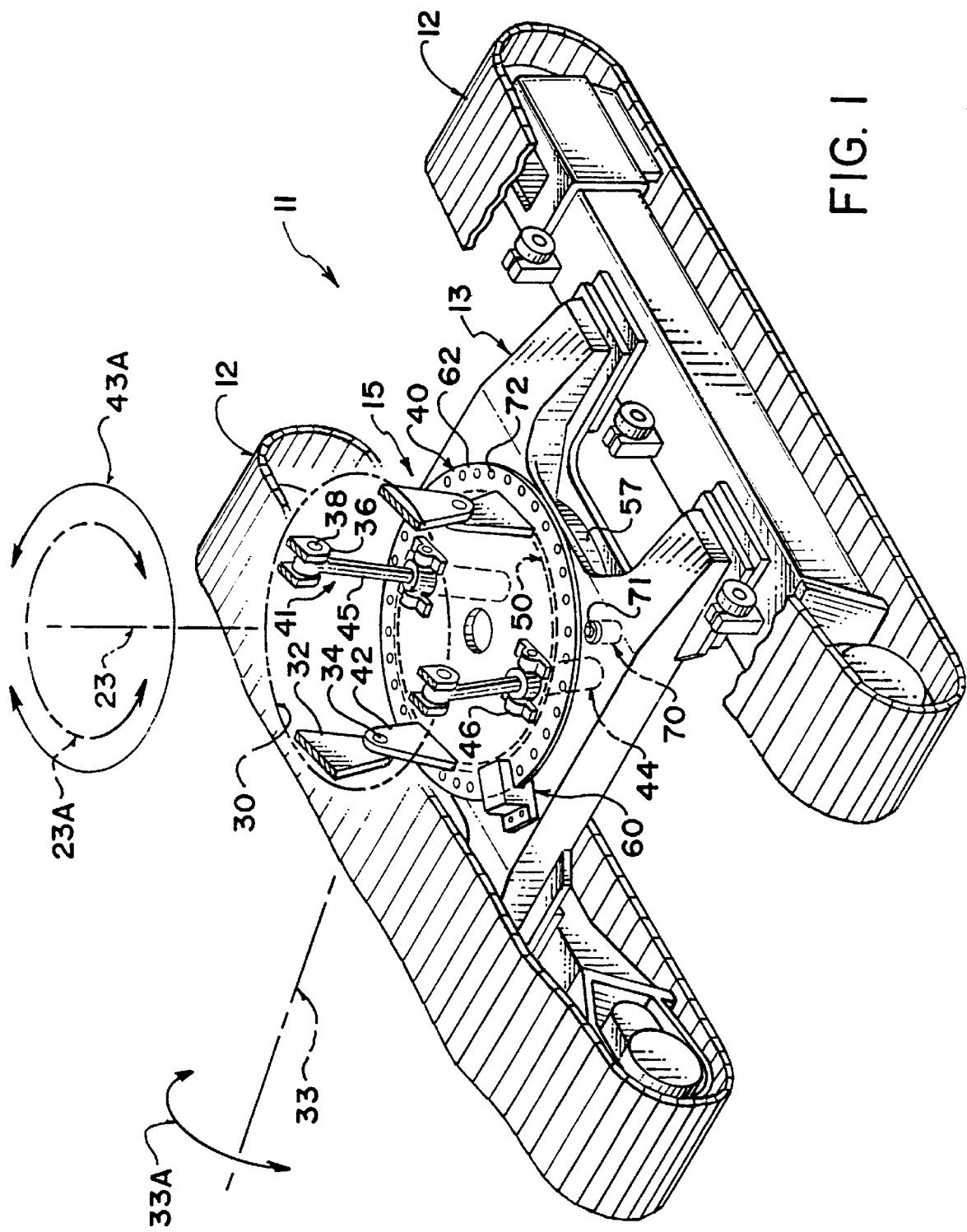
FIG. 1 is a perspective view of a lower portion of an off road machine incorporating a levelling system according to the invention.
Figure 2:
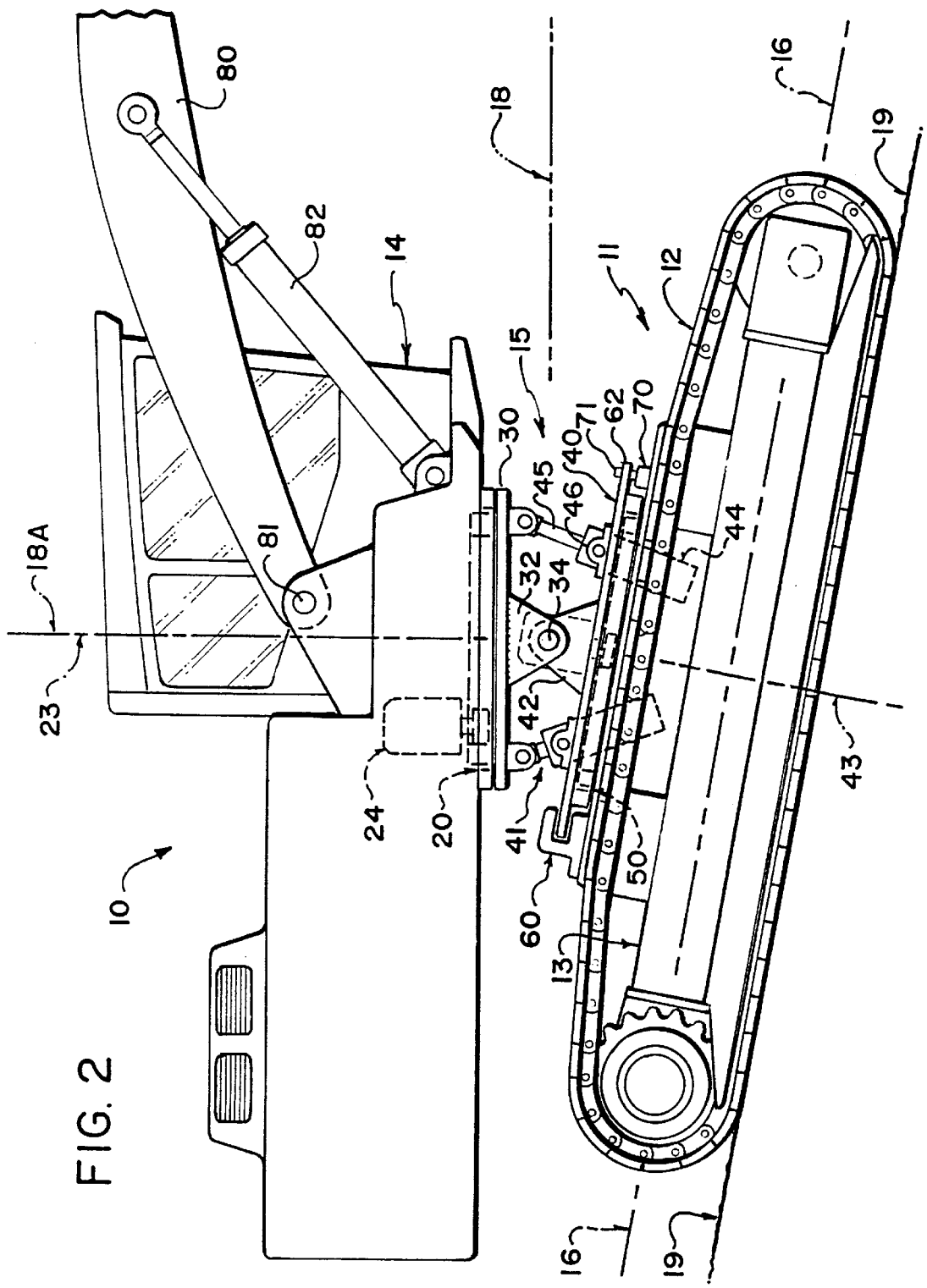
FIG. 2 is a side elevational view of an off road digging machine equipped with a levelling system according to the invention.

FIGS. 1 and 2 show an off road machine 10 according to the invention which incorporates a tilt mechanism 15 according to the invention. Machine 10 has an undercarriage 11 which comprises a pair of tracks 12 mounted on either side of a chassis 13. Tracks 12 extend parallel to the longitudinal axis 16 of chassis 13. Alternative ground engaging members such as wheels or movable legs may be used in place of tracks 12 to enable machine 10 to travel over uneven terrain. In general, when machine 10 is located on uneven ground axis 16 will not be horizontal (e.g. parallel to horizon 18) but will be parallel to the surface 19 of the ground under undercarriage 11.

A superstructure 14 is mounted to chassis 13 by a tilt mechanism 15. Superstructure 14 is pivotally mounted to tilt mechanism 15 by a ring bearing 20. Ring bearing 20 allows superstructure 14 to be rotated about a superstructure axis of rotation 23 as indicated by arrow 23A. An operator of machine 10 will generally want to manipulate tilt mechanism 15 to maintain axis 23 vertical when machine 10 is operating.

In the embodiments shown in the drawings, machine 10 is an excavator and has a boom 80. The elevation of boom 80 is controlled by a hydraulic cylinder 82. Boom 80 comprises a stick 84 operated by a hydraulic cylinder 85 and a bucket 88 operated by a hydraulic cylinder 87. Machine 10 may also be a tree-harvesting machine or any other type of machine which operates on uneven terrain and requires a levelling mechanism.

In typical off-road machines, superstructure 14 can be driven in rotation about axis 23 relative to upper member 30 by a driving means. The driving means may comprise, for example, a pinion gear 26 (FIG. 5) driven by a motor 24, such as a hydraulic motor, mounted to a support structure 21 of superstructure 14 and engaged with a ring gear 22 (FIG. 5) mounted to upper member 30.

Tilt mechanism 15 comprises an upper member 30 hinged to a table 40 (which may also be called a "lower member") by a hinge. The hinge permits upper member 30 to be pivoted about an axis 33 relative to lower table 40 as indicated by arrow 33A. Axis 33 can be described as a "tilt axis". The hinge may comprise any suitable hinge mechanism. Axis 33 may be defined, for example, by the axis of rotation of a pin joint, a ball joint, or some other suitably robust hinge means which permits upper member 30 to tilt relative to lower table 40. The drawings show a hinge mechanism which comprises lugs 32 extending downwardly from upper member 30 and pivotally joined to corresponding lugs 42 extending upwardly from lower table 40 by pins 34. Those skilled in the art will realize that the appended drawings are somewhat schematic in nature. For example, lugs 34 and 42 must be suitably reinforced to be able to withstand the forces which will act on them when machine 10 is operating.

A power actuator, indicated generally by 41, is provided to tilt upper member 30 relative to lower table 40. In the embodiment shown in the drawings, power actuator 41 comprises a pair of hydraulic cylinders 44. Hydraulic cylinders 44 are trunnion mounted to lower table 40 by trunnions 48 (FIG. 5) engaged in suitable bearing blocks 46 mounted to table 40. Hydraulic cylinders 44 project through apertures in table 40 into a well within chassis 13. This keeps the height of tilt mechanism 15 to a minimum. The apertures in table 40 are dimensioned to allow cylinders 44 to pivot slightly about trunnions 48 as upper member 30 is tilted. Rods 45 of cylinders 44 are connected to upper member 30 by pins 38 which engage lugs 36 connected to upper member 30.

By extending rod 45 of one of hydraulic cylinders 44 while retracting rod 45 of the other hydraulic cylinder 44, upper member 30 can be tilted relative to lower table 40 about axis 33 in the directions indicated by arrow 33A.

Lower table 40 is, itself, mounted to chassis 13 by a rotary coupling 50 which preferably comprises a rotary bearing. Lower table 40 can thereby rotate relative to undercarriage 11 about an axis 43 as indicated by arrow 43A. It can be appreciated that the relative orientation of axis 33 and the longitudinal axis 16 of chassis 13 can be altered by rotating table 40 about rotary coupling 50 so that tilt mechanism 15 turns relative to chassis 13.

A braking mechanism 60 (which may be described as "braking means") is provided to lock rotary coupling 50 of tilt mechanism 15 in place with axis 33 at a selected angle relative to axis 16 of chassis 13. Braking mechanism 60 may have various forms. In a preferred embodiment of the invention, as shown in FIGS. 1 and 2, braking mechanism 60 operates like a disc brake. In this embodiment, braking mechanism 60 comprises a flange or "rotor" 62 projecting from table 40. Flange 62 may be a separate part bolted or welded to table 40 or may be unitary and integral with table 40. Flange 62 is concentric with axis 43 of rotary coupling 50. One or more calipers 61 are located on chassis 13 where they can engage flange 62.

Lower table 40 may be locked in rotation relative to chassis 13 by clamping calipers 61 onto flange 62. This may be done, for example, by supplying a pressurized hydraulic fluid to calipers 61, by operating calipers 61 with a suitable mechanical linkage, or by operating calipers 61 with a suitable electromechanical actuator. Braking mechanism 60 can be released by releasing calipers 61 to allow lower table 40 of tilt mechanism 15 to turn freely relative to chassis 13.

Instead of a caliper 61 braking mechanism 60 could comprise an expanding drum type brake, a band type brake or any other practical brake capable of locking table 40 so that it does not rotate about axis 43 relative to chassis 13.

Figure 5:
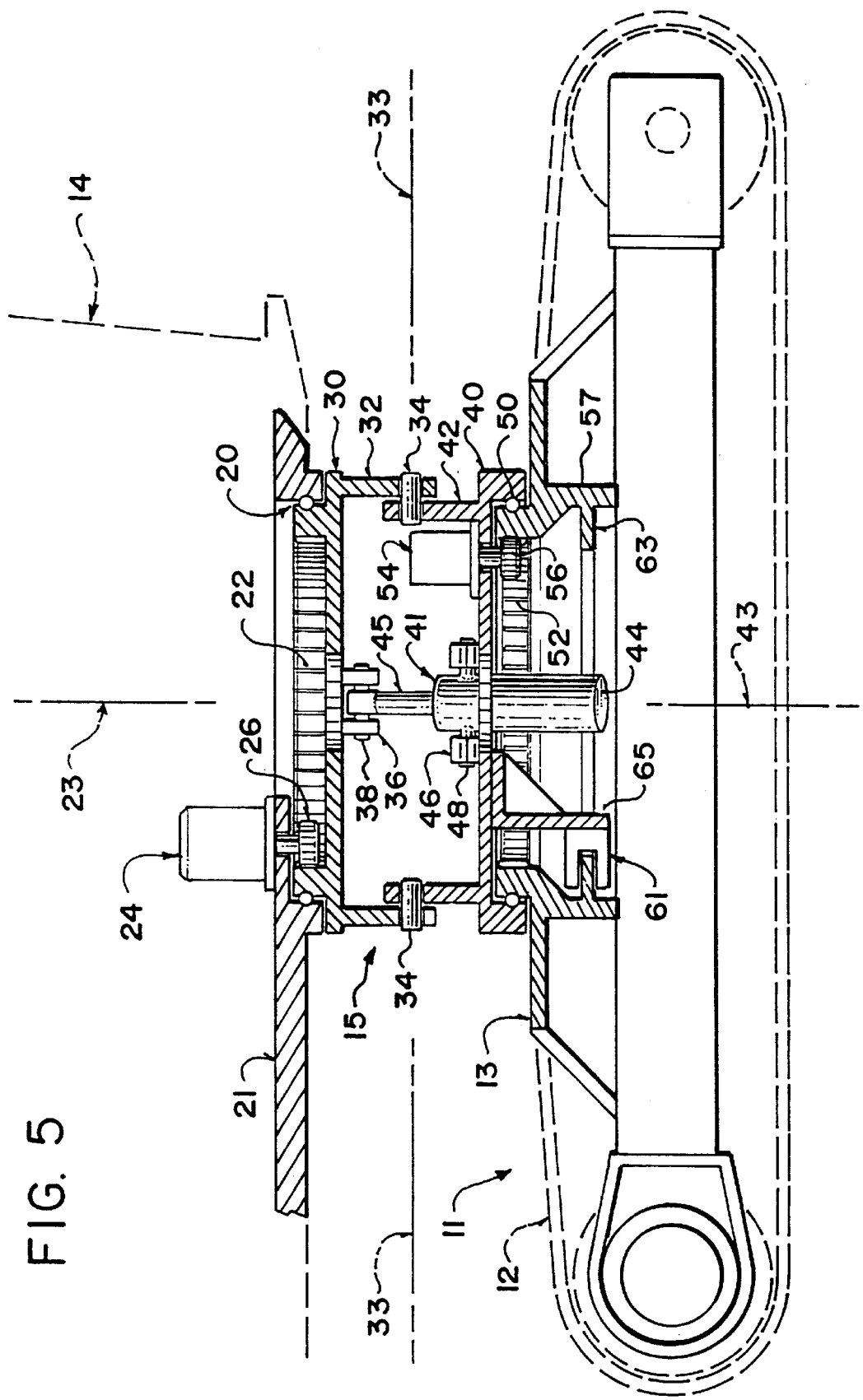

As shown in FIG. 5, calipers 61 could be mounted to a support 65 connected to table 40 and located to engage a flange 63 projecting inwardly from a wall 57 of chassis 13. This embodiment has the advantage that caliper 61 rotates with table 40 and can therefore be more easily controlled from superstructure 14 than a caliper mounted to chassis 13.

A further alternative braking mechanism 60 is shown in FIG. 1. This braking mechanism comprises a pin 71 which is capable of being engaged in one of a plurality of notches or holes 72 spaced around the periphery of flange 62. Preferably pin 71 is biased into engagement with holes 72 by a suitable spring or other suitable bias means. An actuator 70 is provided to withdraw pin 71 from engagement with flange 62. Actuator 70 may be, for example, a solenoid, or hydraulic actuator or a mechanical linkage. Braking mechanism 60 may comprise a plurality of pins 71. Lower table 40 may be allowed to rotate freely in respect of chassis 13 by retracting pins 71.

A braking mechanism 60 may comprise one or more pins 71 in combination with one or more other braking devices, such as calipers 61. Where braking means 60 comprises one or more pins 71 in combination with another braking system, pins 71 provide a back up in case the other braking system (e.g. caliper 61) fails and vice versa.

A machine incorporating the invention preferably, but not necessarily, includes a driving means such as a motor 54 for rotating lower table 40 relative to chassis 13. As shown in FIG. 5, motor 54 may be used to drive the rotation of lower table 40 by means of a pinion gear 56 engaging a ring gear 52. Axis 33 may be placed in any desired orientation relative to chassis 13 by operating motor 54. Braking mechanism 60 may be included in motor 54.

Figure 4:
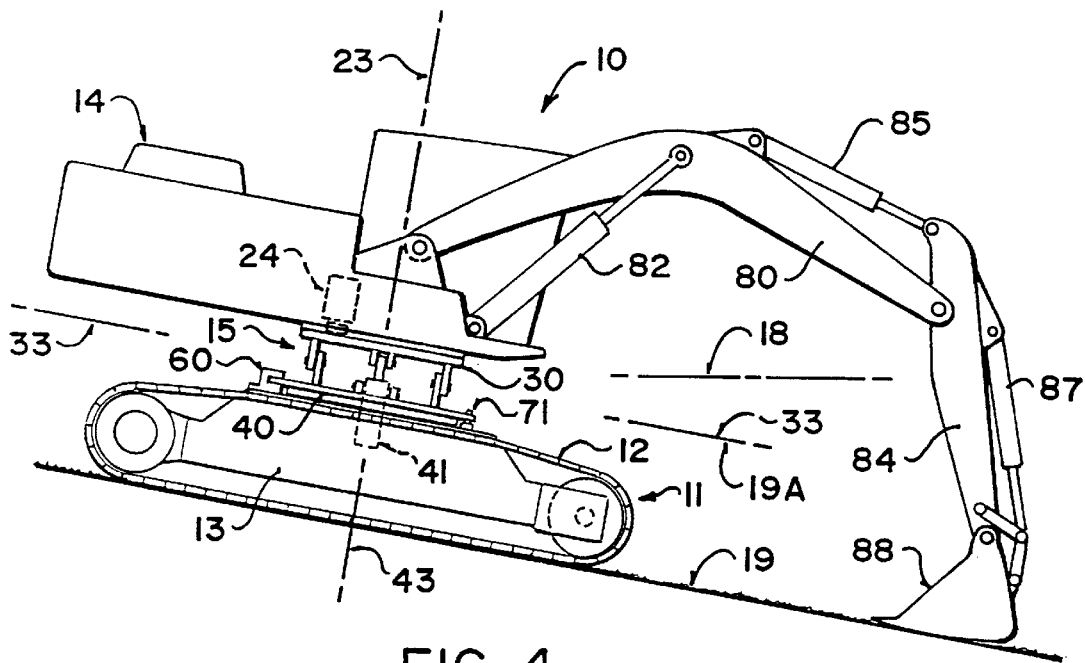
FIGS. 4 and 4A, are side views showing a sequence of steps in the use of a levelling system according to the invention to level an off road machine; and, FIG. 5 is a section through a levelling mechanism according to the invention having an alternative braking mechanism.
Figure 4A:
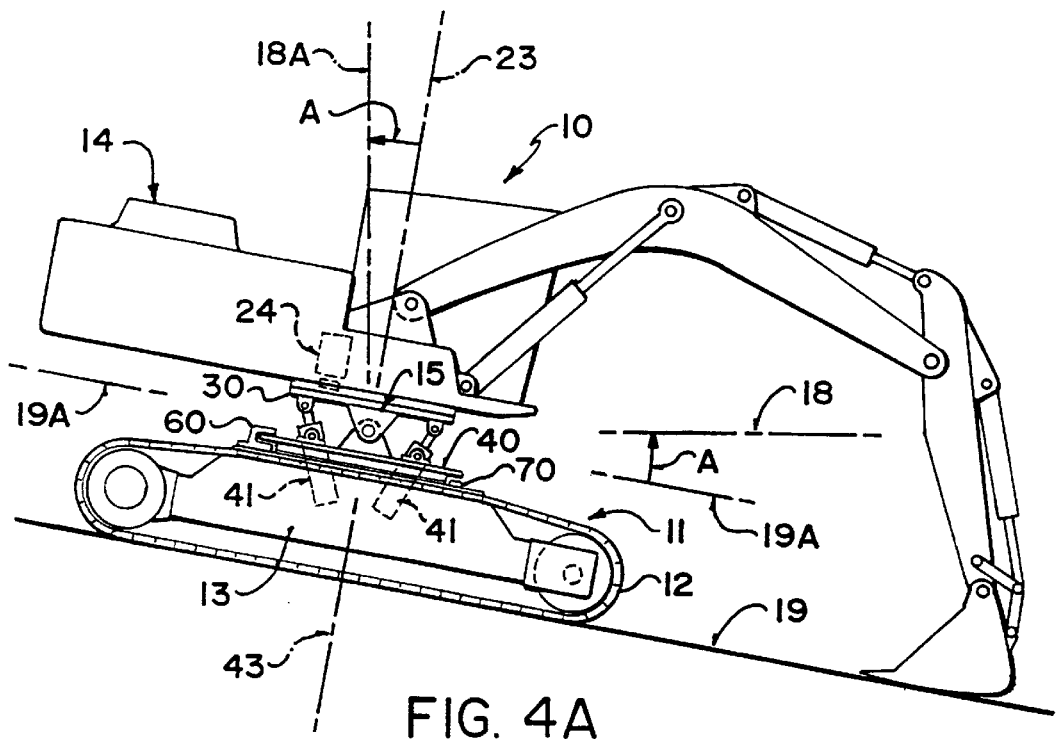

FIGS. 4, 4A and 2 illustrate a sequence of steps in levelling the superstructure 14 of a machine 10 having a tilt mechanism 15. As shown in FIG. 4, when machine 10 is sitting on an uneven ground surface 19 axis 23 of superstructure 14 will generally not be vertical and tilt axis 33 will be randomly oriented in respect of the "fall line" of ground surface 19. In FIG. 4, the fall line of ground surface 19 lies in the direction of longitudinal axis 16.

The first step in levelling superstructure 14 is to release braking mechanism 60 and to rotate lower table 40 about axis 43 relative to chassis 13 until axis 33 is horizontal. At this point, as shown in FIG. 4A, axis 33 will be perpendicular to the fall line of the ground surface 19 on which undercarriage 11 is sitting. A level sensor (not shown) may be provided to detect when axis 33 is horizontal. A signal from the level sensor may be provided to a control means to automatically rotate lower table 40 until tilt axis 33 is horizontal.

This rotation step may comprise operating a driving means, such as motor 54 (FIG. 5) which directly rotates table 40 relative chassis 13. In the alternative, if machine 10 is of a type which has a boom 80 which can be engaged with the ground 19, it is possible to rotate lower table 40 of tilt mechanism 15 relative to chassis 13 by using superstructure rotation motor 24. This can be done by releasing braking means 60, engaging boom 80 with ground 19 (FIG. 4) and operating motor 24 to turn superstructure 14 relative upper member 30 of tilt mechanism 15. Because boom 80 is engaged with the ground, superstructure 14 remains fixed in orientation relative to chassis 13 while tilt mechanism 15 turns relative to both superstructure 14 and chassis 13 as indicated by a comparison of FIGS. 4 and 4A.

Motor 24 (or 54) can be used to turn tilt mechanism 15 until axis 33 is perpendicular to the fall line of the ground surface 19 upon which undercarriage 11 is sitting (e.g. until tilt axis 33 is horizontal). When tilt axis 33 is in the desired orientation then braking means 60 is engaged to maintain tilt axis 33 in its desired orientation.

As shown in FIG. 4A, when tilt axis 33 is horizontal then the plane 19A of superstructure 14 will, in general, still be tilted through an angle A relative to horizontal horizon 18. Axis 23 of rotation of superstructure 14 will be inclined at an equal angle A to the vertical 18A. Superstructure 14 can then be levelled by operating power actuator 41 to tilt upper member 30 about tilt axis 33 until axis 23 is vertical.

Figure 3:
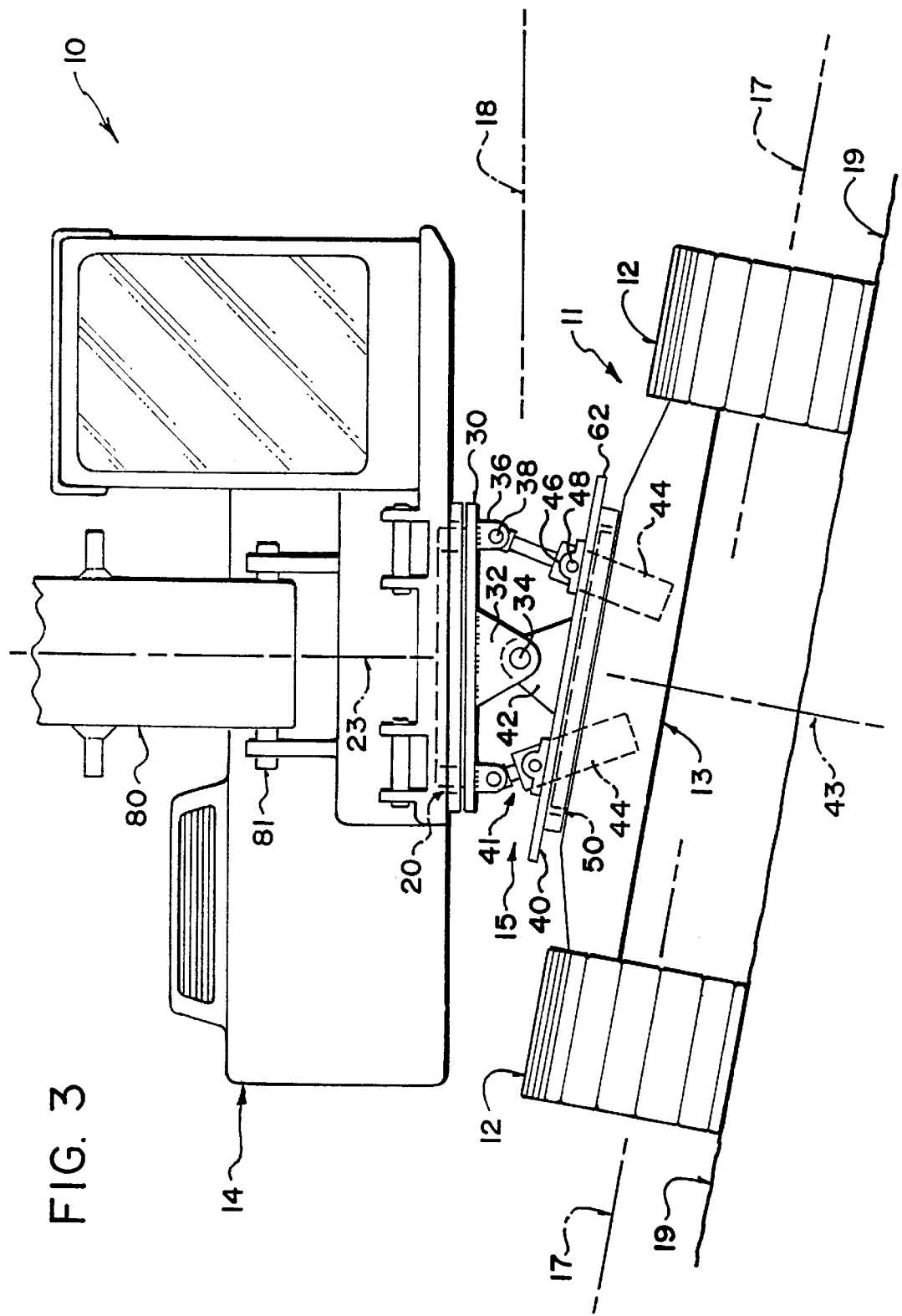
FIG. 3 is a front elevational view of an off road digging machine equipped with a levelling system according to the invention.

In FIGS. 4 and 4A and 2 the fall line of ground surface 19 lies in the direction of longitudinal axis 16 and transverse axis 17 is horizontal. FIG. 3 shows a situation in which undercarriage 11 is oriented with its transverse axis 17 lying in the direction of the fall line of ground surface 19 and longitudinal axis 16 is horizontal. It can be readily appreciated that levelling mechanism 15 may be used to level superstructure 14 if undercarriage 11 is situated so that neither of axes 16 and 17 is horizontal.

It can be appreciated that the tilt mechanism of the invention enables superstructure 14 to be tilted to its full range of tilt in any direction relative to longitudinal axis 16 of chassis 13. This can be achieved with a tilt mechanism 15 which is simple and has few moving parts.

The drawings and text above describe the situation in which axes 23 and 43 intersect with tilt axis 33 at the same point. Tilt axis 33 could be displaced toward one side of table 40 and upper member 30 without departing from the broad scope of the invention. Having tilt axis 33 offset to one side can allow a greater range of tilt than is possible if tilt axis 33 is centrally located as shown in the drawings. If tilt axis 33 is offset to one side then both hydraulic cylinders 44 could be on the same side of tilt axis 33.

Those skilled in the art will realize that conventional rotary fluid and/or electrical couplings may be provided on upper member 30 on axis 23 and on table 40 on axis 43 to provide fluid and.or electrical connections between superstructure 14, tilt mechanism 15 and undercarriage 11.

While the invention is well adapted for use in association with off-road excavators, forestry machines and the like, the invention may be applied to other types of machine. The invention may be provided in the form of a mechanism adapted to be retrofitted to an existing vehicle.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A vehicle comprising a tilt mechanism for maintaining an axis of a superstructure of the vehicle vertical, the vehicle comprising:

(a) an undercarriage adapted to be positioned on a ground plane defined by a longitudinal axis of the undercarriage and an axis transverse thereto;
(b) a superstructure; and
(c) a tilt mechanism connecting the undercarriage to the superstructure, the tilt mechanism comprising:
  (i) a lower member pivotally coupled to the undercarriage;
  (ii) an upper member pivotally coupled to the superstructure;
  (iii) a hinge pivotally connecting the upper and lower members for relative rotation about a tilt axis;
  (iv) a power actuator for tilting the upper member relative to the lower member about the tilt axis; and
  (v) a braking mechanism engageable to fix an orientation of the tilt axis relative to the undercarriage and releaseable to permit the lower member to be rotated to change the orientation of the tilt axis relative to the undercarriage, by rotating the tilt axis in a plane substantially parallel to the ground plane.

2. The vehicle of claim 1 comprising a driving means connected between the upper member and the superstructure for rotating the superstructure relative to the upper member.

3. The vehicle of claim 2 comprising a driving means connected between the lower member and the undercarriage for rotating the lower member relative to the undercarriage.

4. The vehicle of claim 2 wherein the braking mechanism comprises a flange mounted to the undercarriage and a caliper mounted to rotate with the lower member wherein the caliper may be engaged with the flange to prevent rotation of the lower member relative to the undercarriage.

5. The vehicle of claim 2 wherein the braking mechanism comprises a flange mounted for rotation with the lower member and a caliper mounted to the undercarriage wherein the caliper may be engaged with the flange to prevent rotation of the lower member relative to the undercarriage.

6. The vehicle of claim 2 wherein the braking mechanism comprises a pin mounted for rotation with the lower member, the pin movable from a disengaged position to an engaged position wherein the pin engages one of a plurality of apertures or indentations in a member mounted to the undercarriage, wherein rotation of the lower member relative to the undercarriage is prevented when the pin is in its engaged position.

7. The vehicle of claim 6 comprising a spring associated with the pin, the spring biasing the pin toward its engaged position.

8. The vehicle of claim 6 wherein the braking mechanism comprises a pin mounted to the undercarriage, the pin movable from a disengaged position to an engaged position wherein the pin engages one of a plurality of apertures or indentations in a member mounted for rotation with the lower member, wherein rotation of the lower member relative to the undercarriage is prevented when the pin is in its engaged position.

9. The vehicle of claim 8 comprising a spring associated with the pin, the spring biasing the pin toward its engaged position.

10. The vehicle of claim 2 wherein the power actuator comprises a hydraulic cylinder connected between the upper and lower members.

11. The vehicle of claim 10 wherein the hydraulic cylinder is trunnion mounted.

12. The vehicle of claim 11 wherein the power actuator comprises a pair of trunnion mounted hydraulic cylinders connected between the upper and lower members, one on each side of the tilt axis.

13. The vehicle of claim 12 wherein the braking mechanism comprises a flange mounted to the undercarriage and a caliper mounted to rotate with the lower member wherein the caliper may be engaged with the flange to prevent rotation of the lower member relative to the undercarriage.

14. The vehicle of claim 12 wherein the braking mechanism comprises a flange mounted for rotation with the lower member and a caliper mounted to the undercarriage wherein the caliper may be engaged with the flange to prevent rotation of the lower member relative to the undercarriage.

15. The vehicle of claim 12 wherein the braking mechanism comprises a pin mounted for rotation with the lower member, the pin movable from a disengaged position to an engaged position wherein the pin engages one of a plurality of apertures or indentations in a member mounted to the undercarriage, wherein rotation of the lower member relative to the undercarriage is prevented when the pin is in its engaged position.

16. The vehicle of claim 15 comprising a spring associated with the pin, the spring biasing the pin toward its engaged position.

17. The vehicle of claim 12 wherein the braking mechanism comprises a pin mounted to the undercarriage, the pin movable from a disengaged position to an engaged position wherein the pin engages one of a plurality of apertures or indentations in a member mounted for rotation with the lower member, wherein rotation of the lower member relative to the undercarriage is prevented when the pin is in its engaged position.

18. The vehicle of claim 17 comprising a spring associated with the pin, the spring biasing the pin toward its engaged position.

19. A method for levelling an off-road vehicle having an undercarriage, the method comprising the steps of:
  (a) providing the vehicle with a tilting assembly connecting the undercarriage of a superstructure, the tilting assembly comprising:
    (i) a lower member pivotally coupled to the undercarriage, the undercarriage adapted to be positioned on a ground plane defined by a longitudinal axis of the undercarriage and an axis transverse thereto;
    (ii) an upper member pivotally coupled to the superstructure;
    (iii) a hinge pivotally connecting the upper and lower members about a tilt axis;
    (iv) a power actuator for tilting the upper member relative to the lower member about the tilt axis; and
    (v) braking means engageable to fix an orientation of the tilt axis relative to the undercarriage and releaseable to permit the lower member to be rotated thereby changing the orientation of the tilt axis relative to the undercarriage;
  (b) releasing the braking means;
  (c) rotating the lower member relative to the undercarriage in a plane substantially parallel to the ground plane until the tilt axis is horizontal;
  (d) engaging the braking means; and
  (e) operating the power actuator to tilt the upper member about the tilt axis until the superstructure is level.

20. The method of claim 19 wherein the step of rotating the lower member comprises operating a motor coupled between the lower member and the undercarriage to rotate the lower member relative to the undercarriage.

21. The method of claim 19 wherein the step of rotating the lower member comprises engaging a boom on the superstructure with the ground and operating a driving means coupled between the superstructure and the upper member to turn the upper member relative to the superstructure.

22. The method of claim 19 wherein the step of rotating the lower member comprises monitoring a signal from a level sensor and stopping rotation of the lower member when the level sensor indicates that the lower member is horizontal.

23. A tilt mechanism for maintaining an axis of a superstructure of a vehicle vertical, the tilt mechanism comprising:
(i) a lower member adapted to be pivotally coupled to a vehicle undercarriage, the undercarriage adapted to be positioned on a ground plane defined by a longitudinal axis of the undercarriage and an axis transverse thereto;
(ii) an upper member adapted to be pivotally coupled to a vehicle superstructure;
(iii) a hinge pivotally connecting the upper and lower members about a tilt axis;
(iv) a power actuator for tilting the upper member relative to the lower member about the tilt axis; and
(v) breaking means coupled to the lower member, the braking means engageable with a member on the undercarriage to lock an orientation of the tilt axis relative to the undercarriage, the braking means releaseable to permit the lower member to be rotated relative to the undercarriage to rotate the tilt axis in a plane substantially parallel to the ground plane.

24. The tilt mechanism of claim 23 wherein the braking means comprises a flange mountable to a vehicle undercarriage and a caliper mounted to the lower member, the caliper engageable with the flange when the flange and lower member are mounted to a vehicle undercarriage.

25. The tilt mechanism of claim 23 wherein the braking means comprises a flange mounted to the lower member and a caliper mountable to a vehicle undercarriage, the caliper engageable with the flange when the caliper and lower member are mounted to a vehicle undercarriage.

26. The tilt mechanism claim 23 wherein the braking means comprises a pin mounted to the lower member, the pin movable from a disengaged position to an engaged position and an apertured member mountable to a vehicle undercarriage, the apertured member having a plurality of apertures or indentations spaced about its circumference wherein, when the lower member and apertured member are mounted to a vehicle undercarriage and the pin is in its engaged position the pin engages one of the apertures or indentations and rotation of the lower member relative to the undercarriage is prevented.

27. The tilt mechanism claim 23 wherein the braking means comprises an apertured member having a plurality of apertures or indentations spaced about its circumference and mounted to the lower member and a pin mountable to a vehicle undercarriage, wherein, when the lower member and pin are mounted to a vehicle undercarriage, the pin is movable from a disengaged position to an engaged position in which the pin engages one of the apertures or indentations and wherein rotation of the lower member relative to the undercarriage is prevented when the pin is in its engaged position.

* * * * *